W. A. MOFFETT & R. P. PERKINS.
AUTOMATIC CONTROL OF SIGNALS BY LIGHT.
APPLICATION FILED JULY 24, 1912.
1,087,966.
Patented Feb. 24, 1914.
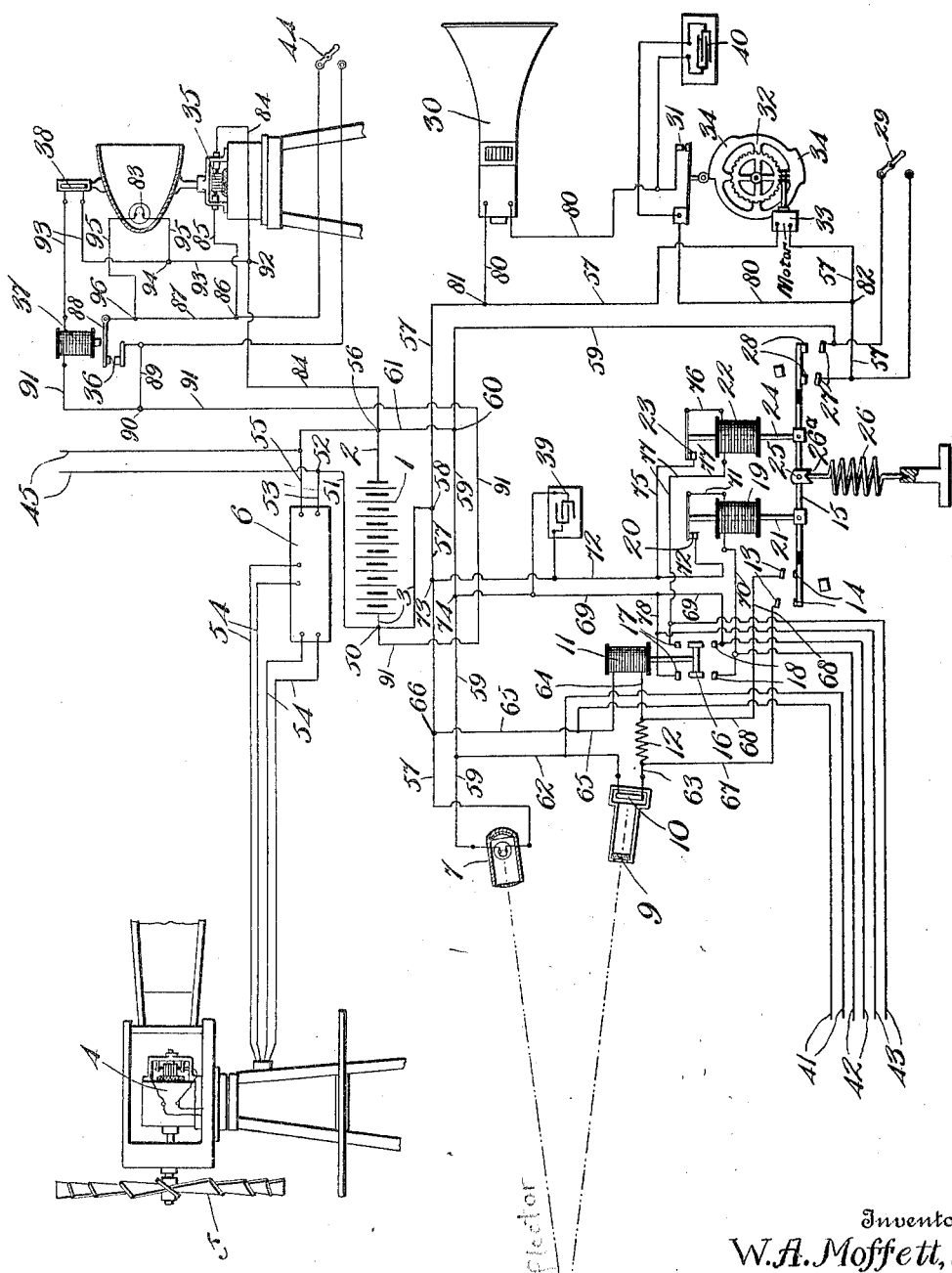
Witnesses
Byron B. Collings
Oliver W. Holmes
Inventors
W. A. Moffett, and
R. P. Perkins
By Wilkinson, Fisher, Witherspoon
& MacKaye
Their Attorneys

UNITED STATES PATENT OFFICE.

WILLIAM A. MOFFETT AND RAYMOND P. PERKINS, OF SAN FRANCISCO, CALIFORNIA.

AUTOMATIC CONTROL OF SIGNALS BY LIGHT.

1,087,966.   Specification of Letters Patent.   Patented Feb. 24, 1914.

Application filed July 24, 1912. Serial No. 711,316.

*To all whom it may concern:*

Be it known that we, WILLIAM A. MOFFETT and RAYMOND P. PERKINS, citizens of the United States, residing at San Francisco, in the county of San Francisco and State of California, have invented certain new and useful Improvements in Automatic Control of Signals by Light; and we do hereby declare the following to be a full, clear, and exact description of the invention, such as will enable others skilled in the art to which it appertains to make and use the same.

This invention relates to means for automatically controlling signals by the action of light, and has for its object to provide a method and apparatus which will accomplish this purpose with certainty and efficiency.

To these ends the invention consists in the novel arrangements of parts constituting our apparatus, all as will be more fully hereinafter disclosed and particularly pointed out in the claims.

Referring to the accompanying drawing forming a part of this specification in which the figure is a diagrammatic illustration of our means for carrying out our invention:—
1 indicates any suitable source of electrical energy, such as a storage battery provided with lead wires 2 and 3. To the lead wire 3 is connected as at 50 the wire 51 connected at 52 to the wire 53, joined to the charging device 6, as shown. The said charging device is connected by the wires 54 to the generator 4, driven by the wind wheel 5, and the said charging device 6 is further connected by the wire 55 to the lead 2 as at 56. Joined to the lead wire 3 as at 58 is the wire 57, joined to the lamp 7, and leading from said lamp 7 is the wire 59, joined as at 60 to the wire 61 connected at the point 56 to the lead wire 2. The lamp 7 projects light rays to the reflector 8, which reflects said rays through a colored or plain glass 9 to a selenium cell 10. The intensity of the light thus reflected to the selenium cell may be readily varied by adjusting the distance of the reflector 8, by varying the character of the glass or screen 9, or by any other suitable means. Said selenium cell is joined by the wire 62 to the wire 59, and leading from said cell is the wire 63 joined to the resistance 12, which in turn is joined to the wire 64 passing to the solenoid or electro-magnet 11, and leading from said solenoid is a wire 65 joined to the wire 57 as at 66. From the construction now disclosed it is obvious that after the storage battery 1 is charged by the generator 4, current continuously passes from said battery through lamp 7 by means of the wires 3, 57, 59, 61 and 2. It is also obvious that more or less current continuously passes through the selenium cell 10 from said battery through the wires 3, 57, 65, solenoid 11, wire 64, resistance 12, wire 63, wire 62, wires 59, 61 and 2. The resistance 12, however, is chosen of such a value that when light is cut off from the cell 10, very little current can pass over the circuit just mentioned, and not enough to raise the armature of said solenoid. A shunt circuit around said resistance 12 is provided through the wires 67 and 68, which wires are provided with the open contacts 13 controlled by the switch contacts 14 on the lever 15. The armature of said solenoid 11 carries switch contacts 16 adapted to control the contacts 18 with which the wires 69 and 70 are provided. The wire 70 is joined to one end of the coil of the solenoid 19, and the wire 71 is joined to the other end of said coil. The said wire 71 is joined to the switch contacts 20, with which the wire 72 is also joined, and said wire 72 is joined to the wire 57 as at the point 73. The wire 69 is joined to the wire 59 as at the point 74. It therefore follows that when the armature of the solenoid 11 closes the contacts 18, current will flow from the battery 1, through the wire 3, wire 57, to the point 73, wire 72, to the contacts 20, wire 71, through the coil of solenoid 19, through the wires 70, through the contacts 18, wire 69, to the point 74, through the wire 59 to the point 60, and over the wires 61 and 2 back to the battery 1. The solenoid 19 will accordingly be energized and the switch contacts 14 will close the circuit at the contacts 13, thus cutting out the resistance 12. The purpose of thus cutting out said resistance 12 briefly stated is, to permit current to flow through the selenium cell 10 when the light from lamp 7 is obscured by fog, or is otherwise reduced, all as will appear more fully below. On the other hand, when current flows through said resistance 12 and the solenoid 11 in the manner above stated, the armature of said solenoid will leave the contacts 18 so as to close circuit through the contacts 17. When this happens, then current will flow from the battery 1 through the wires 3 and 57, point 73, wire 72, wire 75, contacts 23, wire 76, coil of solenoid 22, wire 77, contact 17, wire 78, wire 69, to point 74, wire 59, to point 60, and wires 61 and 2, back to said battery 1. This will cause the solenoid 22 to be energized, its armature to be raised, and the contact at 23 to be broken, all for a purpose to be likewise more fully disclosed hereinafter.

The armature 21 of the solenoid 19 and the armature 24 of the solenoid 22 are connected to the lever 15 as shown, at opposite sides of its fulcrum 25, and a spring 26 engages said lever for yieldingly maintaining the latter in easy swinging position about its fulcrum. The spring 26 is anchored at one end, with its free end engaging a V-shaped recess 26$^a$ formed in the lever 15 radially to the fulcrum 25 of the latter. By this construction, swing of said lever 15 in either direction will cause the free end of the spring 26 to engage the corresponding side wall of the V-shaped recess 26$^a$, and thereby yieldingly maintain said lever at either position of extreme swing. The end of the lever 15 nearest the armature 24 is also provided with switch contacts 28 adapted to close circuit through the contacts 27 carried by the wires 57 and 59, as shown. An auxiliary switch 29 is also provided for independently connecting said contacts 27 when desired.

An electrically actuated horn 30 of any suitable and well known construction, or other suitable signaling apparatus is connected by the wire 80 in a shunt circuit to the wire 57 at the points 81 and 82, as shown. In series in the wire 80 is joined the circuit breaker, or contacts 31 adapted to be actuated automatically by the electric motor 33 in the circuit with the wire 57. The said motor rotates the device 32 provided with the cams 34, adapted to raise and lower the contacts 31 as will be readily understood from the drawings. By properly spacing the said cams 34, any suitable distinctive character may be given to the signals through the horn 30.

From the construction so far disclosed, it will be clear that should a fog arise which would cause the artificial light from the lamp 7 to be refracted or broken up, or otherwise prevented from reaching the selenium element 10, the electrical resistance through said element will be greatly increased and the electric current sufficiently cut out from the solenoid 11 to prevent its armature from being raised. The said armature will thereupon drop and close the contacts 18 to permit the passage of current through the switch solenoid 19 over the circuit above disclosed. The energizing of the said solenoid 19 will accordingly cause its armature 21 to be elevated, which in turn will cause the switch contacts 14 to close the circuit at the points 13, and will also cause the circuit through said solenoid to be broken at the point 20. The lifting of the said lever 15, however, will close the circuit through the contacts 27, and the spring 26 will hold the said lever in such position. Accordingly, current will flow from the battery 1 through the wire 3 to the point 58, along the wire 57 to the point 81, and still along the wire 57 through the motor 33 to the point 82 and to and through the contacts 27. From the contacts 27 the current will flow along the wire 59 to the point 60, and along the wires 61 and 2 back to the battery. The motor 33 will accordingly actuate the device 32 to cause predetermined audible signals to be emitted from the horn 30. These signals will continue until the fog leaves, or until the light from the lamp 7 is otherwise turned on to the selenium cell 10, whereupon sufficient current will pass through the solenoid 11 to break the circuit through the contacts 18 and to close the circuit through the contacts 17. As soon as current passes through the contact 17 the solenoid 22 is energized, and the switch contacts 28 are caused to break the circuit at the points 27, thus stopping the audible signals through the horn 30. However, it might happen that the fog does not lift sufficiently to cause the contact 16 of the solenoid 11 to rise, and yet it would lift sufficiently to make it desirable to shut off the audible signals from the horn 30. In order therefore to insure the contact 16 closing the circuit at the point 17 whenever the fog has so lifted as to permit a predetermined intensity of light to flow upon the selenium cell 10, we have provided the shunt circuit composed of the wires 67 and 68 through the contacts 13. The action of this circuit is to permit current to flow around the resistance 12 and through the solenoid 11, and thereby supplement the current which normally flows when the light is strong through said solenoid 11 and said resistance 12.

When it is desired to utilize our invention for the production of light signals or flashes at night, we employ the electric lamp 83 rotated by the motor 35 in any suitable manner, to give light signals of any desired distinctive character. Said lamp and motor are fed from battery 1 as follows:—Joined to the lead wire 2 as at the point 56 is the wire 84 passing to one side of the motor 35, and to the other side of said motor is the wire 85 joined as at 86 to the wire 87, connected to the armature 88 of the magnet 37 controlling the contact 36 connected to the wire 89, joined as at 90 to the wire 91, connected at 50 to the lead 3 of said battery, as shown. The lamp is fed as follows:— Joined to the wire 84 as at 92 is the wire 93 to which is connected as at 94 the wire 95 passing through the lamp, and connected at its other end as at 96 to the wire 87 as shown. The wire 93 likewise passes through the selenium cell 38 and fastens to one end of the coils of the magnet 37. The other end of said coils is connected to the wire 91 as shown. A switch 44 is provided to control manually the circuit between the points 96 and 90. Signals from the lamp 83, accordingly, will be produced as follows:— When the sun shines upon the cell 38, its resistance is lowered, and current from the lead wire 3 will pass through the wire 91, through the magnet 37, the wire 93, through the cell 38, to point 92, and thence over the wire 84 back to the battery. The magnet 37 being thus energized, the circuit at the contact 36 will be broken, and no light from the lamp 83 will be produced. Further, the circuit through the motor 35 will likewise be broken and the lamp will not be revolved. When the sun goes down, or the light is otherwise cut off from the selenium cell 38, the magnet 37 will not be energized, owing to the greater resistance of said cell 38, and the circuit at the contact 36 will be made. Current will now flow from battery 1 over the lead wire 3, wire 91, to the points 90, wire 89, through the contact 36, armature 88, to the point 96, over the wire 95, through the lamp 83 to the point 94, over the wire 93 to the point 92 and over the wires 84 and 2 back to the battery. The lamp accordingly will be lighted. In the same way current, after reaching the point 96 will pass on down the wire 87 to the point 86, over the wire 85, through the motor 35, over the wire 84, to the point 56, and over the wire 2 back to the battery, so that the said motor will cause the lamp 83 to revolve.

39 and 40 represent the usual electrical condensers bridged across the circuits as shown, in order to prevent sparking.

In order that this apparatus may be provided with a multiple wiring so that it may operate from various points, we have provided the wires 41 which join the wires 62 and 65 as shown, and therefore lead off current from said wires to any suitable point. In the same way we have provided the wires 42 joined to the wires 69 and 70, which likewise lead off current from said wires 69 and 70 to any suitable point. The same remarks apply to the wires 43 which are joined to the wires 77 and 78; and the same remarks likewise apply to the wires 45 which are joined to the wires 53 and 55.

It is obvious that those skilled in the art may vary the details of construction as well as the arrangement of parts without departing from the spirit of our invention, and therefore we do not wish to be limited to the above disclosure except as may be required by the claims.

What we claim is:—

1. In a signaling system, the combination of a signaling apparatus, electro-magnetic means for governing the operation of said apparatus, means regulated by the action of light for controlling the action of said electro-magnetic means, means for projecting light rays on the light-regulated means, and means for automatically increasing the sensitiveness of said electro-magnetic means upon the cutting out of light rays from said light-regulated means.

2. In a signaling system, the combination of a signaling apparatus, electro-magnetic means for governing the operation of said apparatus, an electric circuit for energizing said electro-magnetic means, a selenium element in said electric circuit, means for projecting light rays on said selenium element, and means for automatically reducing the resistance of said circuit upon the cutting out of light rays from said selenium element.

3. In a signaling system, the combination of a signaling apparatus, electro-magnetic means for governing the operation of said apparatus, an electric circuit for energizing said electro-magnetic means, a high resistance and a selenium element connected in series in said electric circuit, means for projecting light rays on said selenium element, and means for automatically shunting out said high resistance upon the cutting out of light rays from said selenium element.

4. In a signaling system, the combination of a signaling apparatus, electro-magnetic means for governing the operation of said apparatus, a high resistance electric circuit for energizing said electro-magnetic means, a selenium element in said electric circuit, means for projecting light rays on said selenium element, means for automatically reducing the resistance of said electric circuit upon the cutting out of light rays from said selenium element, and means for automatically restoring the normal high resistance to said electric circuit upon the projection of light rays on said selenium element.

5. In a signaling system, the combination of a signaling apparatus, shiftable means for regulating the operation of said apparatus, actuating means for said shiftable means, means controlled by the action of light for governing the operation of said actuating means, and means operated by said actuating means for automatically cutting out the operation of the latter.

6. In a signaling system, the combination of a signaling apparatus, shiftable means for regulating the operation of said apparatus, actuating means for said shiftable means, means controlled by the action of light for governing the operation of said actuating means, means operated by said actuating means for automatically cutting out the operation of the latter, and means for yieldingly maintaining said shiftable means in its shifted positions.

7. In a signaling system, the combination of a signaling apparatus, shiftable means, actuating means for said shiftable means, electro-magnetic means controlled by the action of light for governing the operation of said actuating means, and means actuated by said shiftable means for regulating the operation of said signaling apparatus and varying the sensitiveness of said electro-magnetic means.

In testimony whereof, we affix our signatures, in presence of two witnesses.

WILLIAM A. MOFFETT.
RAYMOND P. PERKINS.

Witnesses as to the signature of William A. Moffett:
W. H. BELKNAP,
EUGENE BASTIAN.

Witnesses as to the signature of Raymond P. Perkins:
EDW. L. WOODRUFF,
ARTHUR C. ANDERSON.

Copies of this patent may be obtained for five cents each, by addressing the "Commissioner of Patents, Washington, D. C."